United States Patent [19]
Badoux et al.

[11] 3,773,457
[45] Nov. 20, 1973

[54] APPARATUS FOR EXTRACTING, STACKING AND DISCHARGING MOULDED CUPS, JARS AND SIMILAR FROM MOULDING APPARATUS

[76] Inventors: Daniel Badoux; Robert Carry, both of Decines, France

[22] Filed: June 19, 1972

[21] Appl. No.: 263,853

[52] U.S. Cl.............. 425/388, 214/1.4, 214/6.5, 425/437, 425/455
[51] Int. Cl............................................ B29c 17/04
[58] Field of Search................ 425/388, 455, 437; 264/316, 335; 214/1.4, 6.5

[56] References Cited
UNITED STATES PATENTS

| | | | |
|---|---|---|---|
| 3,153,262 | 10/1964 | Steketee | 425/455 X |
| 3,161,915 | 12/1964 | Thiel | 425/388 X |
| 3,389,811 | 6/1968 | Frank | 214/6.5 |
| 3,408,689 | 11/1968 | Heiner | 425/455 |
| 3,454,991 | 7/1969 | Rees | 425/437 X |
| 3,591,903 | 7/1971 | Bowles | 425/455 X |
| 3,593,377 | 7/1971 | Edwards | 425/455 X |
| 3,605,192 | 9/1971 | Edwards | 425/437 X |
| 3,700,375 | 10/1972 | Rees | 425/455 X |

*Primary Examiner*—Robert L. Spicer, Jr.
*Attorney*—Arthur E. Dowell, Jr. et al.

[57] ABSTRACT

A device for moulding cups of synthetics material by means of an upper mould member and a reciprocable lower mould member is provided with an apparatus for extracting, stacking and discharging moulded cups for the moudling apparatus. The apparatus has a suction nozzle, which, when horizontal, attaches itself by suction to the wall of a cup on the upper part after lowering of the lower mould part. A pneumatic jack moves the nozzle backwards away from the mould and simultaneously, a cam slot causes a tube mounting the nozzle to rotate about the tube axis so as to swing the nozzle into a vertical position. This action swings the cup into a horizontal position and begins to insert the cup into the open end of what was hitherto the last cup in a horizontal row (a stack on its side). The cup is released from the nozzle by cutting off the suction. As the lower mould part rises in a new moulding operation, the movement pivots an arm which moves a pusher bar back to pack the last formed cup into the horizontal stack. Each reciprocation of the lower mould part actuates a counting device which upon counting a prescribed number of cup moulding operations causes another pusher to be pneumatically lifted through a slot in a plate supporting the horizontal stack and be moved pneumatically along the slot to push the horizontal stack away.

9 Claims, 7 Drawing Figures

APPARATUS FOR EXTRACTING, STACKING AND DISCHARGING MOULDED CUPS, JARS AND SIMILAR FROM MOULDING APPARATUS

This invention relates to the manufacture of hollow articles such as cups, jars, and other similar packaging articles of substantially cylindrical shape.

It is known that articles of this type are frequently produced by injecting, blowing, or shaping an appropriate synthetic material under vacuum. The shaping mould generally comprises several impressions and it is arranged so as to release the articles when the two parts of the mould open. In current practice, the articles which are removed from their moulds are moved along either mechanically or pneumatically (current of compressed air) and they are collected in disorderly fashion in any appropriate receptacle. The articles thus collected must then be placed manually one inside the other in order to form stacks comprised by a predetermined number of articles, these stacks are then arranged in containers or other means for transportation. It will be understood that the nampower necessary for removing the articles from the receptacle, for stacking them and for counting them is considerable, so that it actually slows down the manufacturing process, and therefore increases the cost.

With a view to removing this drawback, an object of the invention is to provide apparatus intended to be associated with a machine for the manufacture of hollow articles of the aforesaid type, which installation is arranged in such a way as to remove the articles when the mould opens, to insert them one in the other and to discharge them in the form of stacks comprising a predetermined number of articles, all these operations taking place entirely automatically without any manual operations.

The apparatus according to the invention comprises in combination extraction means having suction means capable of grasping the articles released from the mould, of changing the orientation of the articles and of depositing the articles on a receiving plate in a condition in which they are partially inserted into each other, stacker means having an alternating motion provided in such a way as to axially push back the article previously deposited on the plate by the extraction means in order to fully engage it in the stack, which is simultaneously moved back, and discharge means comprising retractable abutments associated with drive means for longitudinal motion with a view to moving the stacks thus obtained longitudinally when the latter comprise a pre-determined number of articles.

In a preferred embodiment of the invention, the extraction means comprises a hollow shaft, the internal space of which is simultaneously connected to a source of suction and to a series of radial suction means intended to be brought into the immediate vicinity of the wall of the articles. This shaft is displaced transversely and it comprises a crank engaged in a profiled ramp in such a manner as to cause said shaft to pivot during its transverse displacement, the suction effect stopping automatically when articles are placed on the receiving plate.

The stacker means is advantageously controlled by the moving part of the mould. It comprises a swinging arm able to be located above the receiving plate and radially integral with a crank secured to the opening part of the mould.

The discharge means preferable comprises a series of pneumatic jacks equal in number to that of the stack obtained on the plate. These jacks are mounted on a moving cross member forming a carriage, the arrangement being controlled such that once each stack comprises the desired number of articles, the jacks project above the receiving plate and are consequently displaced longitudinally with respect to the latter in order to discharge the aforesaid stacks.

The accompanying drawings illustrate, by way of example, one embodiment of the apparatus formed according to the invention;

FIG. 6 is a sectional view of the device intended for the pneumatic control of the extraction suction devices;

Figure 1:
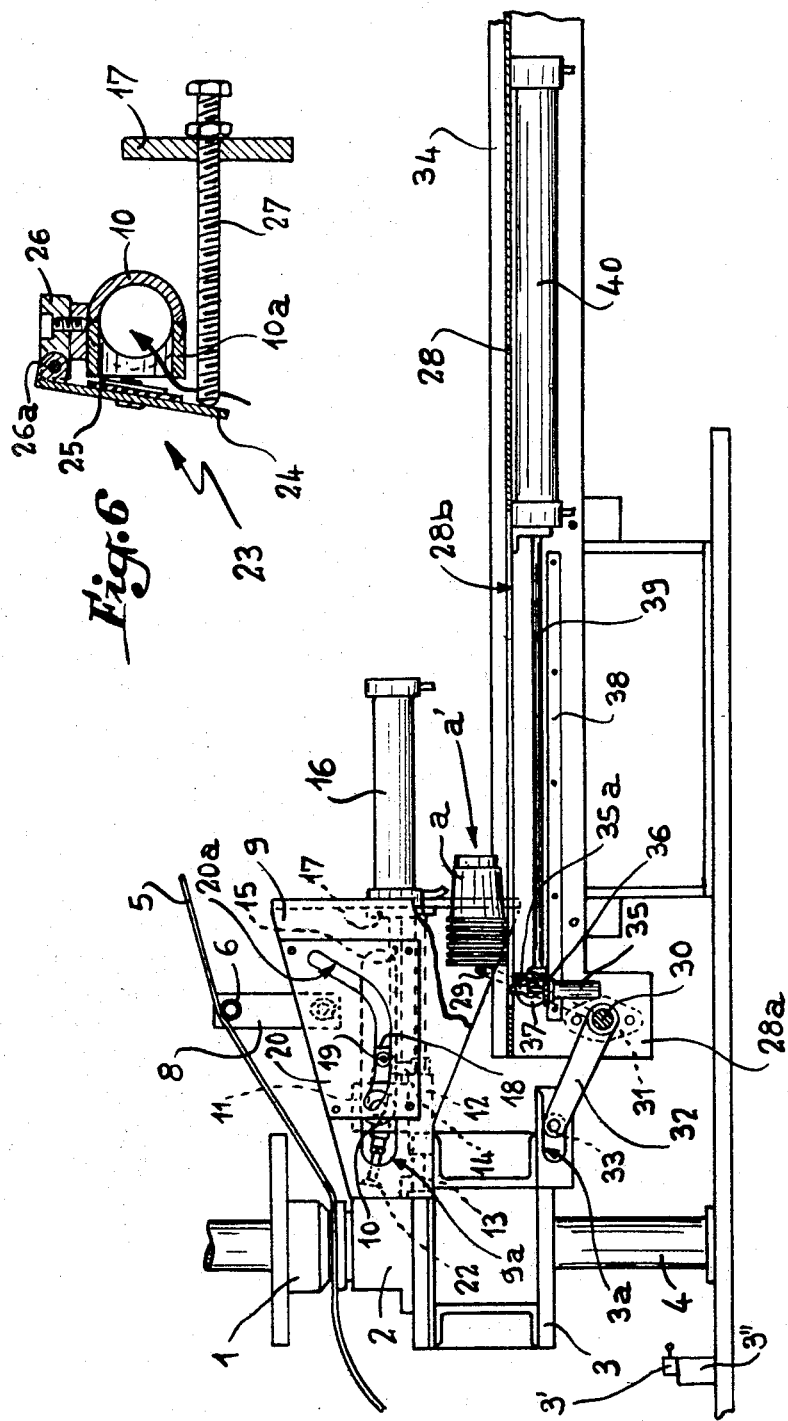
FIG. 1 is a fragmentary side view thereof in partial longitudinal section, it being assumed that the apparatus is associated with a machine for shaping under vacuum for the manufacture of cups.
Figure 2:
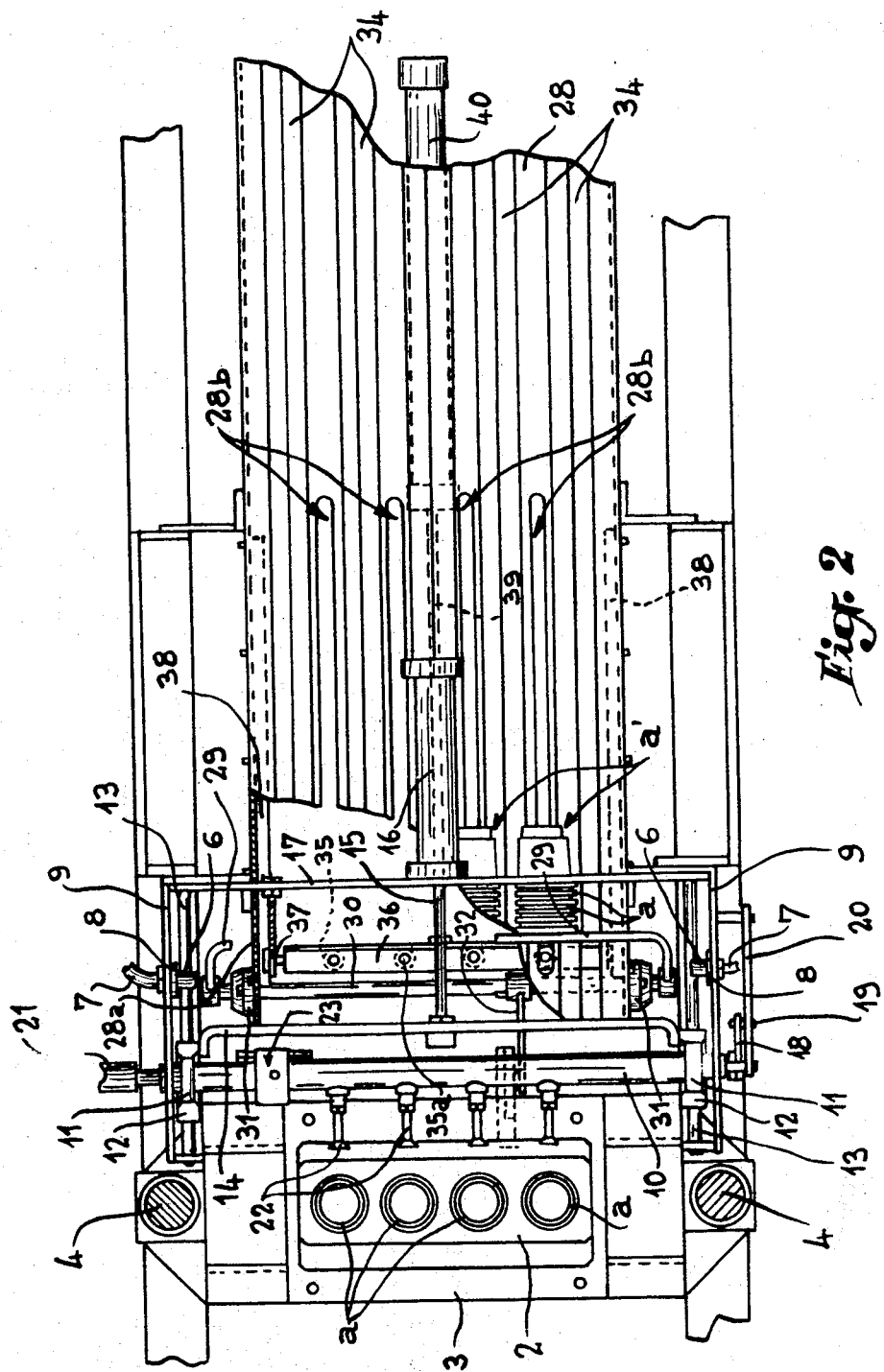
FIG. 2 is a fragmentary plan view of FIG. 1, partly in section.
Figure 3:
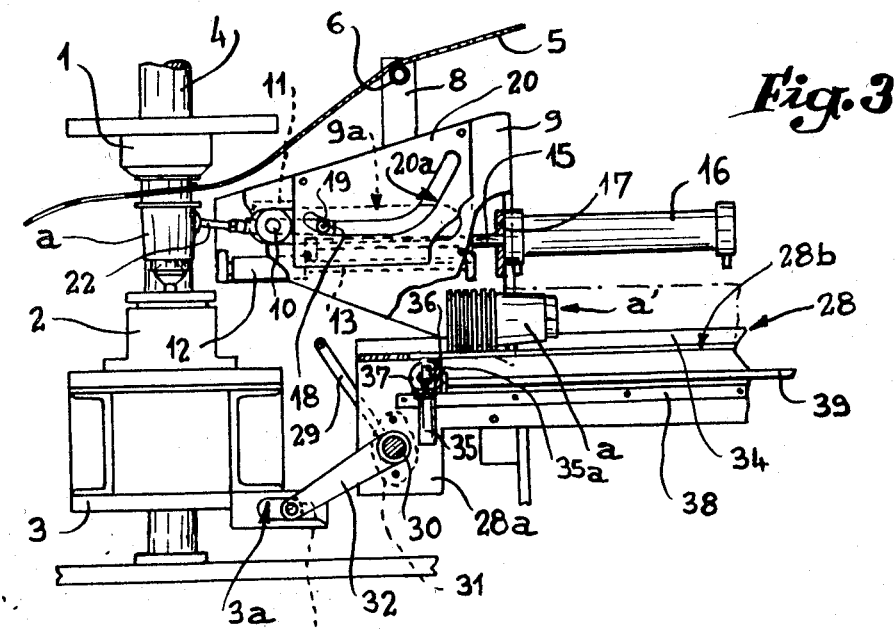
FIGS. 3 and 4 are side views partially reproducing FIG. 1, at the time of two different stages of the operating process.

In FIGS. 1 to 4 it is assumed that the apparatus illustrated is associated with a machine for the manufacture of cups *a* by shaping a strip or ribbon of synthetics material under vacuum. The mould comprises a stationary upper part 1 and a mobile lower part 2, the latter being integral with a plate 3 slidably mounted on two vertical pillars 4 and appropriately controlled in its reciprocating motion. The strip, indicated by reference 5, is unwound continuously and passes over a hollow heating drum 6 supplied through a conduit 7, said drum being supported at its ends by two vertical arms 8 secured at their bases to side plates 9. This strip 5 is introduced between the parts 1 and 2 of the mould, which comprises four shaping impressions; the moving part 2 is provided with an extraction mechanism such that when the mould is open as shown in FIG. 3, the four cups *a* are located above the part 2, the cups being simply supported at their base.

Figure 5:
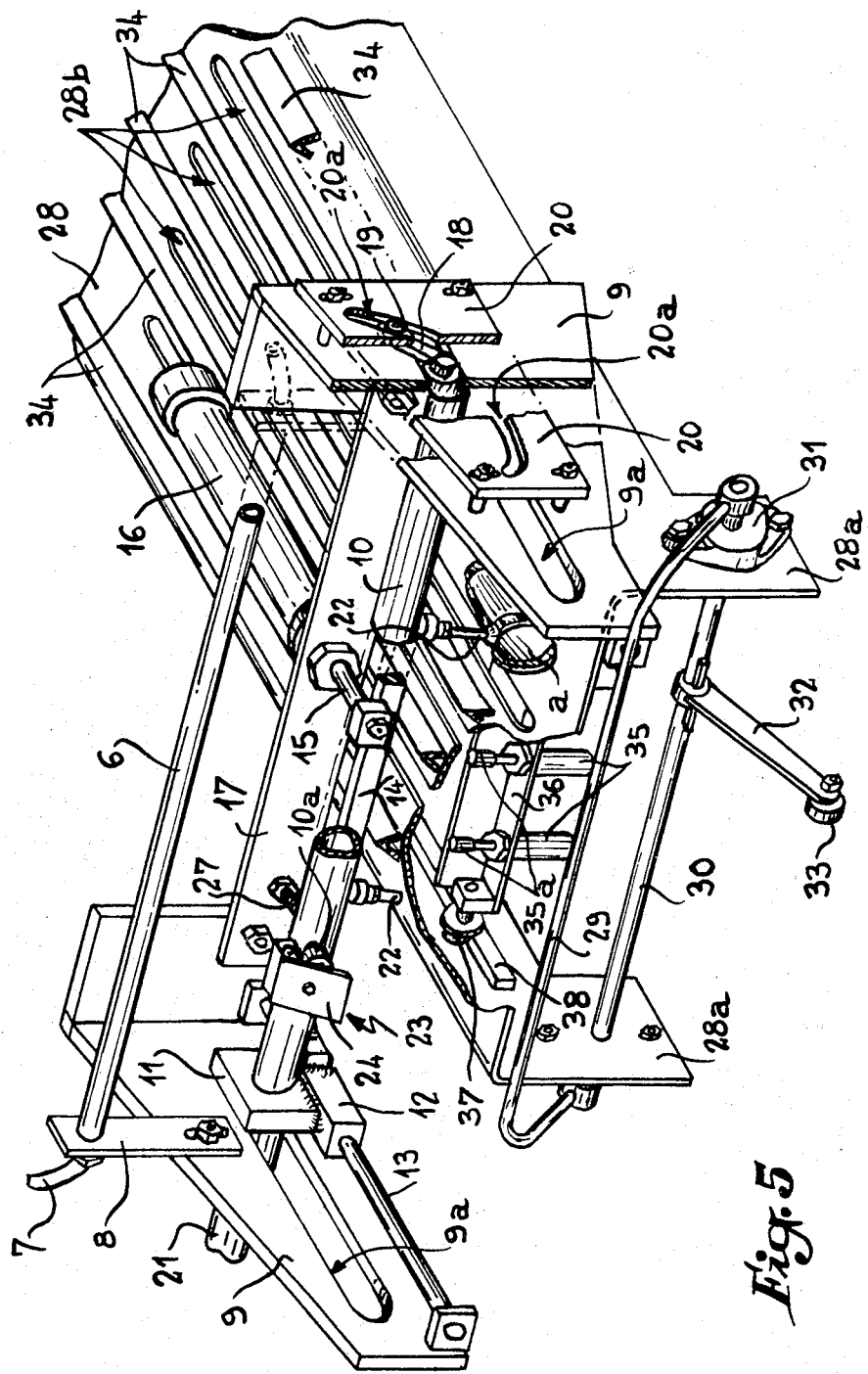
FIG. 5 is a perspective view showing the general arrangement of the apparatus.

In the first place the apparatus comprises an extraction device constituted by a tubular shaft 10 extending horizontally, transversly with respect to the direction of displacement of the strip 5. As shown more particularly in FIG. 5, this shaft 10 is supported by two lateral bearings 11 integral with slides 12; each slide 12 is mounted on a horizontal rod or guide 13 provided inside the corresponding side-plate 9. The two slides 12 are connected to each other by a stirrup 14 directed parallel to the shaft 10 and the central part of which is secured to a moving member 15 of a double acting pneumatic jack 16, which is intended to effect the alternating displacement of the aforesaid shaft. The jack 16 is secured in cantilever fashion to a cross member 17 which connects the two side-plates 9.

The ends of the shaft 10 project beyond the bearings 11 and are engaged in apertures 9a of the side plates 9. One of these projecting ends is angularly integral with a radial crank 18 the free end of which supports a roller 19; the latter is introduced with reduced clearance inside an aperture or curved ramp 20a cut out in a lateral side member 20 connected to the outside of the corresponding side plate 9. The opposite end of the shafts 10 is connected to a flexible pipe 21 which is connected to a low pressure container or other appropriate source of suction. Between the two bearings 11, the tubular shaft 10 is provided with four radial suction devices 22. It will also be noted that this shaft is equally provided with a "vacuum-breaking" mechanism 23 intended for controlling the suction devices 22, and the arrangement of which is illustrated in detail in FIG. 6.

As shown in this figure, this mechanism 23, comprises a rocking valve 24 provided with a gasket 25. This valve 24 is pivoted at 26a to a part 26 integral with the shaft 10, which has a lateral cut-out and is arranged in such a way as to provide a cylindrical lateral extension 10a forming a seating for the above mentioned gasket 25. The control of the valve 24 is ensured by abutment against a threaded rod 27 secured in adjustable manner to the cross member 17.

Figure 4:
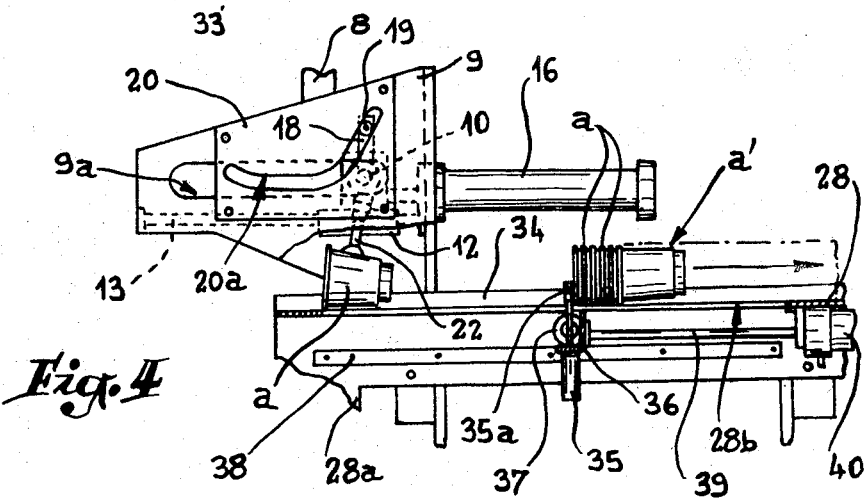

The operation of the above described extraction device is easily understood. In FIG. 3 the shaft 10 is in its most advanced position in which the free end of the suction devices 22 is substantially in contact with the cups a released by the mould 1, 2. The reduced pressure effect prevailing inside the shaft 10 keeps the valve 24 and the gasket 25 against the seat 10a such that due to suction the suction devices grasp the four cups a. At this moment the jack 16 begins to contract, in such a way that the shaft 10 displaces towards the rear. Nevertheless, and as illustrated in FIG. 4, the ramp 20a controls the crank 18 of this shaft 10 which rotates about itself; at the end of the stroke of the jack 16 the suction devices 22 are thus orientated in a substantially vertical manner above a receiving plate 28 provided below the cross member 17. Since simultaneously the rod 27 supported by this cross member has caused the valve 24 to open, the reduced pressure effect ceases at the end of the suction devices 22 such that the latter release the cups a which are collected by the plate 28. The jack 16 returns the shaft 10 to its advanced position, said shaft pivoting under the effect of the ramp 20a and crank 18; the extraction device is thus ready for a new operating cycle.

The apparatus also comprises a stacker mechanism which is constituted by an arm 29 (FIG. 5) in the form of a stirrup the ends of which are fixed on a lower shaft 30 supported by bearings 31 integral with two front side members 28a of the plate 28. Keyed on the shaft 30 is an arm or crank 32 provided at its end with a roller 33 which is introduced with reduced clearance into a slide 3a (FIG. 1) provided at the base of the plate 3.

It will be understood that under these circumstances the vertical alternating displacement of the plate 3 causes the swinging of the shaft 30 and of the stacker arm 29; the latter is designed in such a way that it comes to be located above the plate 28 whilst gently pushing the cup a which has been removed, towards the rear. During the general operation of the arrangement, the cups a successively removed as they are formed are deposited on the plate 28 by the suction devices 22 which, due to their swinging movement, partially engages them in each other. Immediately after the return of the suction devices 22 the stacker arm 29 pushes the cups towards the rear so as to completely insert them in each other and to produce horizontal stacks a' directed parallel to each other on the plate 28.

These stacks a' are held on the plate 28 by means of longitudinal guides 34 appropriately spaced transversely with respect to each other. Between these guides 34 the plate 28 is provided with axial grooves 28b inside each of which there is engaged the moving member 35a of a small pneumatic jack 35 directed vertically. The four jacks 35 are supported by a cross member 36 equipped with rollers 37 which co-operate with longitudinal rails 38, the arrangement 36,37 constituting in this way a carriage which displaces below the plate 28. In the contracted position (FIGS. 1 and 3) the moving members 35a are located inside grooves 28b without projecting above the aforesaid plate. The carriage 36,37 is controlled longitudinally in its reciprocating motion by a pneumatic jack 39,40 the moving member 39 of which is appropriately secured to the cross piece 36.

Figure 7:
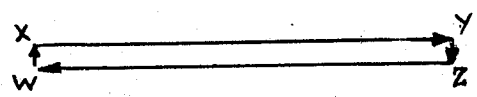
FIG. 7 is a diagram illustrating the operation of the discharge device.

With the plate 3 of the mould there is associated a feeler member referred to at 3' which actuates a counting mechanism 3", which controls the supply of the jacks 35 and jacks 39,40. In these circumstances, when the stacks a' comprise the desired number of cups a in the first plate, the counting mechanism causes the jack 35 to extend, such that the members 35a rise above the grooves 28b (vertical stroke w–x of FIG. 7). Immediately afterwards the jack 39,40 is caused to retract (horizontal stroke x–y) which has the effect of moving the stacks a' backwards in the manner illustrated in FIG. 4. These stacks may be removed manually in order to be placed directly in conveying devices. At the end of the stroke of the jack 39,40, the jacks 35 are caused to retract (stroke y–z) then the jack 39,40 is itself caused to extend stroke (z–w) in order to return the carriage 36,37 to the advanced position, without the moving members 35a, banging into the cups a which have meanwhile been deposited by the suction devices 22 on the plate 28.

Finally, it will be understood that all the operations for removing the cups a, for stacking the latter to form stacks a' and for discharging the latter from the machine, are carried out entirely automatically without any manual operations.

It will be understood that other mechanisms for the pneumatic control of suction devices 22 may be provided.

What is claimed is:

1. An apparatus for the extraction, stacking and discharge, as they are manufactured, of hollow articles such as cups, jars and similar packaging articles produced by moulding synthetics material, comprising in combination extraction means having suction means able to grasp the articles released from the mould, of changing the orientation of the articles and of depositing the articles on a receiving plate in a condition in which they are partially inserted in each other, stacker means having an alternating motion arranged in such a way as to axially push back the article previously deposited on the plate by the extraction means in order to fully insert the article in the stack which is simultaneously moved back and discharge means comprising retractable abutments associated with drive means for longitudinal motion with a view to displacing the stacks obtained longitudinally when the latter comprise a predetermined number of articles.

2. An apparatus according to claim 1, wherein the extraction means comprises a hollow shaft, the internal space of which is connected to a source of suction and to a plurality of radial suction means intended to be brought into the immediate vicinity of the wall of the articles released from the mould.

3. An apparatus according to claim 2, wherein a transverse reciprocating motion is imparted to the hollow shaft and comprising a radial crank engaged in a profiled ramp in such a way as to cause said shaft to pivot during its displacement, the suction effect ceasing when this shaft is at the end of its return stroke.

4. An apparatus according to claim 3 wherein bearings supporting the hollow shaft are supported by slides mounted on horizontal guides, these slides being connected to each other by a transverse stirrup to which the control member is secured.

5. An apparatus according to claim 2, wherein the internal space of the hollow shaft is connected to the atmosphere through a rocking valve controlled by a stationary rod which bears against the aforesaid valve when the hollow shaft arrives at the end of its return stroke.

6. An apparatus according to claim 1, wherein the stacking means comprises a swinging arm integral with a shaft on which is keyed a crank controlled by the vertical displacement of the moving part of the mould.

7. An apparatus according to claim 1, wherein each of the retractable abutments of the discharge means is constituted by a moving part of a pneumatic jack, which part is engaged in a longitudinal groove of the receiving plate.

8. An apparatus according to claim 7 wherein the pneumatic jacks are supported by a moving cross member, provided in the manner of a carriage controlled longitudinally in its reciprocating motion.

9. An apparatus according to claim 7, wherein the retractable abutments and the means for longitudinal motion which are associated with them are placed under the control of a counting mechanism actuated at the time of each of the reciprocating strokes of the moving part of the mould.

* * * * *

UNITED STATES PATENT OFFICE
CERTIFICATE OF CORRECTION

Patent No. 3,773,457        Dated November 20, 1973

Inventor(s)     DANIEL BADOUX ET AL

It is certified that error appears in the above-identified patent and that said Letters Patent are hereby corrected as shown below:

In the heading of the patent (first column)

between lines 8 and 9 insert:

[30] Foreign Application Priority Date:

June 21, 1971 - France - No. 71.23550

Signed and sealed this 23rd day of April 1974.

(SEAL)
Attest:

EDWARD M.FLETCHER,JR.        C. MARSHALL DANN
Attesting Officer             Commissioner of Patents